United States Patent
Higashi et al.

(10) Patent No.: US 8,120,842 B2
(45) Date of Patent: Feb. 21, 2012

(54) WAVELENGTH CONVERSION DEVICE, LASER APPARATUS, IMAGE FORMING APPARATUS, AND DISPLAY APPARATUS

(75) Inventors: Yasuhiro Higashi, Miyagi (JP); Yasuhiro Satoh, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 201 days.

(21) Appl. No.: 12/532,851

(22) PCT Filed: Feb. 6, 2008

(86) PCT No.: PCT/JP2008/052390
§ 371 (c)(1),
(2), (4) Date: Sep. 24, 2009

(87) PCT Pub. No.: WO2008/117578
PCT Pub. Date: Oct. 2, 2008

(65) Prior Publication Data
US 2010/0073755 A1    Mar. 25, 2010

(30) Foreign Application Priority Data
Mar. 26, 2007    (JP) .................................. 2007-078233

(51) Int. Cl.
*G02F 1/23* (2006.01)
*G02F 1/35* (2006.01)
*G02F 2/02* (2006.01)
(52) U.S. Cl. ........... 359/328; 359/278; 359/326; 372/22
(58) Field of Classification Search .................. 359/278, 359/326–332; 385/122; 372/21–22
See application file for complete search history.

(56) References Cited

U.S. PATENT DOCUMENTS

| | | | | |
|---|---|---|---|---|
| 5,875,053 | A * | 2/1999 | Webjorn et al. | 359/326 |
| 5,880,871 | A * | 3/1999 | Cooke et al. | 359/254 |
| 5,986,798 | A * | 11/1999 | Karlsson et al. | 359/326 |
| 6,411,420 | B1 * | 6/2002 | Yamada et al. | 359/247 |
| 7,230,753 | B2 * | 6/2007 | Mizuuchi et al. | 359/321 |
| 7,403,327 | B2 * | 7/2008 | Kitamura et al. | 359/328 |
| 7,693,194 | B2 * | 4/2010 | Sakai et al. | 372/29.022 |

FOREIGN PATENT DOCUMENTS

| | | |
|---|---|---|
| JP | 4-3128 | 1/1992 |
| JP | 6-138506 | 5/1994 |
| JP | 2003 312064 | 11/2003 |

(Continued)

OTHER PUBLICATIONS

Office Action issued Feb. 17, 2011 in European Patent Application No. 08 720 727.0-2205.

Louchev, O. A. et al., "Thermal Inhibition of High-Power Second-Harmonic generation in Periodically poled $LiNbO_3$ and $LiTaO_3$ Crystals", Applied Physics Letters, vol. 87, pp. 131101-1-131101-3, 2005.

(Continued)

*Primary Examiner* — Daniel Petkovsek
(74) *Attorney, Agent, or Firm* — Oblon, Spivak, McClelland, Maier & Neustadt, L.L.P.

(57) ABSTRACT

A wavelength conversion device enabling the stable output of high-power harmonic light is disclosed. The wavelength conversion device includes $MgO:LiNbO_3$ (PPMgLN) having a periodic polarization reversed structure, and the +Z and −Z surfaces of the PPMgLN are covered with thin chrome (Cr) film. In the PPMgLN, the incident surface and output surface are disposed on the −X side and +X side, respectively, in the longitudinal direction. Because of this structure, even when a high-power laser fundamental wave is incident, the PPMgLN can avoid destruction and damage due to the electric field, thereby enabling the stable output of high-power harmonic.

13 Claims, 12 Drawing Sheets

FOREIGN PATENT DOCUMENTS

| | | |
|---|---|---|
| JP | 2005 156634 | 6/2005 |
| JP | 2006 106804 | 4/2006 |
| JP | 2006 259338 | 9/2006 |
| JP | 2006 276326 | 10/2006 |
| JP | 2006 308731 | 11/2006 |
| JP | 2006 343397 | 12/2006 |
| JP | 2007 121515 | 5/2007 |
| JP | 2007 156177 | 6/2007 |
| JP | 2008 158017 | 7/2008 |
| JP | 2008 170582 | 7/2008 |
| JP | 2008 241785 | 10/2008 |
| WO | WO 97/43684 | 11/1997 |

OTHER PUBLICATIONS

Ishizuki, H., "Periodical Poling Characteristics of Congruent MgO:LiNbO$_3$ Crystals At Elevated Temperature", Applied Physics Letters, vol. 82, No. 23, pp. 4062-4064 (Jun. 9, 2003).

Brief Communication issued on Sep. 16, 2011 in the corresponding European Application No. 08720727.0.

H. Ishizuki, et al., "Fabrication and Characterization of 5-mm-thick periodically poled MgO:LiNbO$_3$ device", Lasers and Electro-Optics, 2005, (CLEO), Conference on Baltimore, vol. 3, XP010877071, May 22, 2005, pp. 2108-2110.

* cited by examiner

WAVELENGTH CONVERSION DEVICE, LASER APPARATUS, IMAGE FORMING APPARATUS, AND DISPLAY APPARATUS

TECHNICAL FIELD

The present invention relates to a wavelength conversion device, a laser apparatus, an image forming apparatus, and a display apparatus, and more specifically to a wavelength conversion device including a nonlinear optical crystal having a periodic polarization reversed structure, a laser apparatus including the wavelength conversion device, and an image forming apparatus including the laser apparatus.

BACKGROUND ART

A ferroelectric crystal such as $LiNbO_3$ and $LiRaO_3$ is called a nonlinear optical crystal due to its nonlinear optical characteristics, and is used as a wavelength conversion device for converting the wavelength of light. Especially, the nonlinear optical crystal having a polarization reversed structure where polarization directions are periodically reversed and meeting the Quasi-Phase-Matching (QPM) condition has a large nonlinear coefficient and therefore has high wavelength conversion efficiency. Further, the nonlinear optical crystal can be applied to a wide wavelength range by changing the period of the polarization reversed structure.

As the types of the nonlinear optical crystal having the polarization reversed structure, the waveguide type in which a waveguide having the width of about several μm and having the polarization reversed structure is fabricated on the surface of a crystal, and the bulk type using the entire crystal and polarization reversion structure is formed in the entire thickness of the crystal have been studied.

The bulk-type nonlinear optical crystal can convert the wavelength of a beam having a larger diameter than that of the waveguide-type. Therefore, the bulk-type nonlinear optical crystal can receive laser light having higher energy and emit light having higher power. Further, the bulk-type nonlinear optical crystal can be aligned easily.

As one of the promising bulk-type nonlinear optical crystals capable of generating a visible light of a Continuous Wave (CW) having watt-level high power obtained based on a single path conversion of the fundamental wave, $LiNbO_3$ (Periodically Poled $LiNbO_3$: PPLN) having a periodic polarization reversed structure has attracted the attention. However, the $LiNbO_3$ has a problem that the output becomes unstable due to the influences of, for example, optical damage and Green Induced Infrared Absorption (GRIIRA). Also, it is necessary to be heated to a high temperature to stabilize the operations.

Because of the disadvantages, MgO doped $LiNbO_3$, namely, $MgO:LiNbO_3$ has been studied. The $MgO:LiNbO_3$ is expected to be used as the nonlinear optical crystal capable of outputting a watt-level CW light at room temperature with a single path configuration because of its better optical damage resistivity compared with that of $LiNbO_3$.

For example, Patent Document 1 discloses a short-wavelength light source including an optical device having a single-polarized ferroelectric substrate, polarization reversed domains formed on the ferroelectric substrate, and grooves formed on the surface of the ferroelectric substrate. This short-wavelength light source may control the heat generated by the absorption of the harmonic wave generated when a fundamental wave is converted into a watt-level high-power harmonic wave.

Further, Patent Document 2 discloses an optical wavelength conversion device including a crystal having a nonlinear optical effect, periodic polarization reversed layers formed on the crystal, an incident surface formed on the end surface of the crystal, a radiating surface formed on the other surface of the crystal, and a metal film formed on at least a part of the surface or the rear surface of the crystal. This optical wavelength conversion device may control the change of the second harmonic output caused by the alternation of the refractive index due to the pyroelectric effect by the temperature change.

Patent Document 1: Japanese Patent Application Publication No. 2006-308731
Patent Document 2: Japanese Patent Application Publication No. 2006-106804

DISCLOSURE OF THE INVENTION

Problems to be Solved by the Invention

However, conventional measures for controlling heat issues are not enough to obtain a stable output of further high-power harmonics. As a matter of fact, when the input power increases, the nonlinear optical crystal may be destroyed or damaged.

The present invention is made in light of the above problems and may provide a wavelength conversion device capable of outputting stable high-power harmonic waves.

Further, the present invention may provide a laser apparatus capable of outputting a high-power stable laser light.

Still further, the present invention may provide an image forming apparatus capable of forming an image quickly.

Still further, the present invention may provide a display apparatus capable of displaying information with excellent display quality.

Means for Solving the Problems

According to a first aspect of the present invention, there is provided a first wavelength conversion device including a nonlinear optical crystal having a periodic polarization reversed structure, and conductive members covering at least two regions of the nonlinear optical crystal in which a spontaneous polarization direction of the nonlinear optical crystal crosses the region.

According to a second aspect of the present invention, there is provided a second wavelength conversion device including a nonlinear optical crystal having a periodic polarization reversed structure, a cross-sectional shape orthogonal to the periodic direction of the polarization reversed structure being substantially a circle or an ellipse, and a conductive member covering a circumferential surface of the nonlinear optical crystal.

According to the first wavelength conversion device or the second wavelength conversion device, even when the input power of a fundamental wave is high, the intensity of the electric field generated in the nonlinear optical crystal is lower than that of a conventional wavelength conversion device, thereby avoiding the destruction of or the damage to the nonlinear optical crystal. Therefore, a high-power harmonic can be stably output.

According to a third aspect of the present invention, there is provided a laser apparatus including at least one laser light source, and the wavelength conversion device according to an embodiment of the present invention disposed on an optical path of a laser light from the at least one laser light source.

According to this aspect, since the laser apparatus has the wavelength conversion device according to an embodiment of the present invention, a high-power laser light can be stably output.

According to a fourth aspect of the present invention, there is provided an image forming apparatus for forming an image on an image display medium. The image forming apparatus includes at least one laser apparatus according to an embodiment of the present invention, and an exposure apparatus for exposing the image display medium based on image information.

According to this aspect, since the image forming apparatus includes at least one laser apparatus according to an embodiment of the present invention, an image can be formed quickly.

According to a fifth aspect of the present invention, there is provided a display apparatus for displaying information on a screen using a light. The display apparatus includes a light source unit having at least one laser apparatus according to an embodiment of the present invention, and an optical system for transmitting a light from the light source unit to the screen.

According to this aspect, since the display apparatus includes at least one laser apparatus according to an embodiment of the present invention, information can be displayed with excellent display quality.

Figure 1:
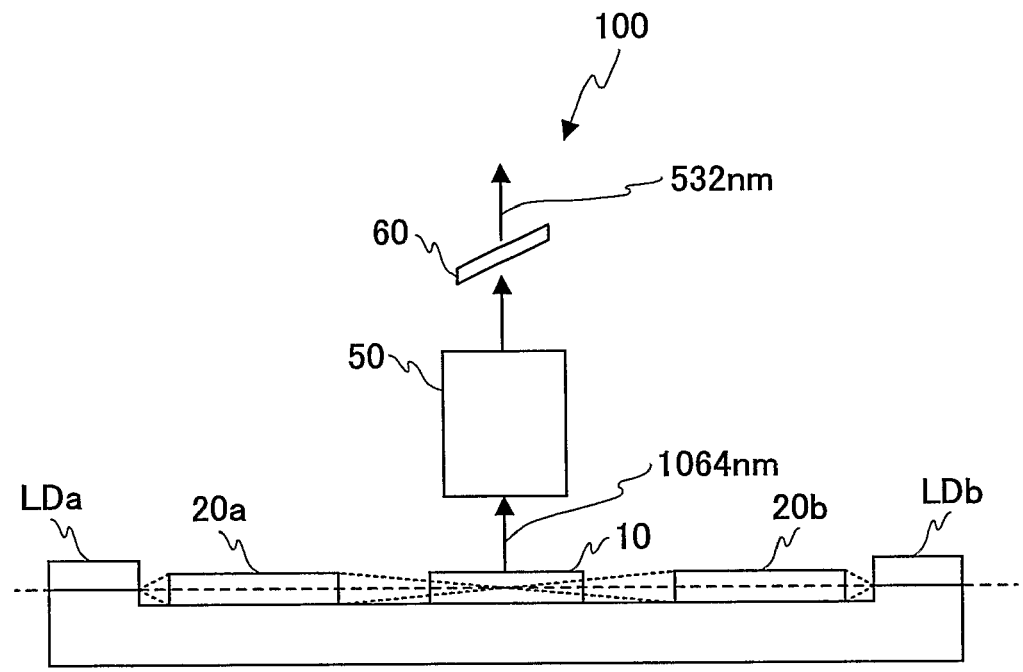
FIG. 1 is a drawing illustrating a laser apparatus according to one embodiment of the present invention.

DESCRIPTION OF THE REFERENCE NUMERALS 50 wavelength conversion device
50c thin chrome (Cr) film (conductive member)
100 laser apparatus
1100 multicolor image forming apparatus (image forming apparatus)
1101 exposure apparatus
2000 laser display apparatus (display apparatus)
2001 light source unit
2100 projector (display apparatus)
2101 light source device (light source unit)

BEST MODE FOR CARRYING OUT THE INVENTION

<<Laser Apparatus>>

In the following, a laser apparatus according to one embodiment of the present invention is described with reference to FIGS. 1 through 5. FIG. 1 schematically shows the configuration of a semiconductor laser excitation solid-state laser apparatus 100 capable of efficiently exciting a laser crystal by applying exciting rays to its side surfaces according to one embodiment of the present invention.

The solid-state laser apparatus 100 includes two semiconductor laser arrays (LDa and LDb) each for excitation, two convergence optical systems (20a and 20b), a solid-state laser crystal 10, a wavelength conversion device 50, and a mirror 60.

The semiconductor laser array LDa and the semiconductor laser array LDb are equivalent to each other, each capable of outputting a 50 W laser light having wavelength of 808 nm for excitation.

The convergence optical system 20a converges the laser light for excitation from the semiconductor laser array LDa.

The convergence optical system 20b converges the laser light for excitation from the semiconductor laser array LDb.

Figure 2:
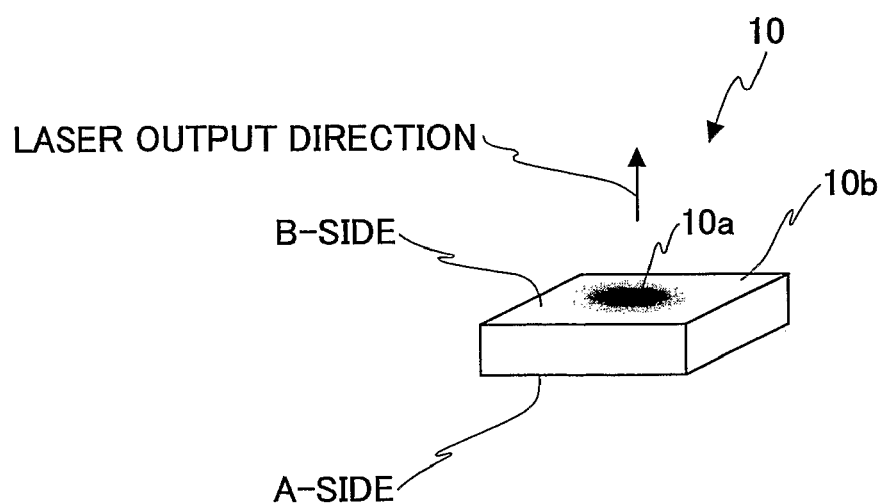
FIG. 2 is a drawing illustrating a solid-state laser crystal 10 in FIG. 1.

The solid-state laser crystal 10 is, for example, a uniaxial crystal of yttrium vanadate ($YVO_4$) having a rectangular plate shape (a chip shape). For example, as shown in FIG. 2, the solid-state laser crystal 10 includes a core section 10a where neodymium (Nd) is doped as additive (luminescent center) to be excited by the laser light for excitation, and a cladding section 10b that is hardly contributing to the laser excitation and that surrounds the core section 10a in a surface orthogonal to the outputting direction of the laser light (hereinafter abbreviated as "laser output direction").

It should be noted that a larger amount of Nd is doped in the center of the core section 10a. In this case, the maximum value of the doped Nd amount is 0.5 at. %.

The solid-state laser crystal 10 has a length in the laser output direction (thickness) of 0.5 nm, and has 5 mm by 5 mm cross-sectional dimensions orthogonal to the laser output direction.

Dielectric material is coated on the side surfaces of the solid-state laser crystal 10 so as to increase the transmittance of the laser light for excitation (to, for example, 99.5%).

Dielectric material is coated on an end surface (hereinafter may be referred to as "A-side" for simplicity purposes) opposite to an end surface in the laser output direction of the solid-state laser crystal 10 so as to increase the reflectance with respect to the laser light having wavelength of 1064 nm (hereinafter may be referred to as "laser fundamental wave" for simplicity purposes) (to, for example, 99.5%).

Dielectric material is coated on the end surface in the laser output direction of the solid-state laser crystal 10 (hereinafter may be referred to as "B-side" for simplicity purposes) so that the reflectance is slightly lower than that of the A-side (for example 95%).

Namely, a laser oscillator is formed between those two end surfaces of the solid-state laser crystal 10, constituting a microchip-type laser.

The wavelength conversion device 50 is disposed on the optical path of the laser fundamental wave output from the solid-state laser crystal 10, and converts the wavelength of the laser fundamental wave. The wavelength conversion device 50 includes MgO:LiNbO$_3$ (Periodically Poled MgO:LiNbO$_3$, hereinafter may be referred to as "PPMgLN") having a periodic polarization reversed structure as a nonlinear optical crystal.

In this embodiment, as an example, the PPMgLN has a rectangular cylinder shape with the dimensions of 20 mm (length), 3 mm (width), and 1 mm (height), and has a periodic polarization reversed structure formed in the length direction.

A z-cut 5 mol % MgO-doped LiNbO$_3$ substrate with 1-mm thickness is used for the PPMgLN. The polarization reversed structure is formed by applying an electric field between the +Z surface and the −Z surface with respect to the crystal orientation. (refer to "H. Ishizuki, I. Shoji, and T. Taira, "Periodical poling characteristics of congruent MgO:LiNbO$_3$ crystals at elevated temperature", Appl. Phys. Lett. Vol. 82, p 4062, 2003")

Figure 3A:
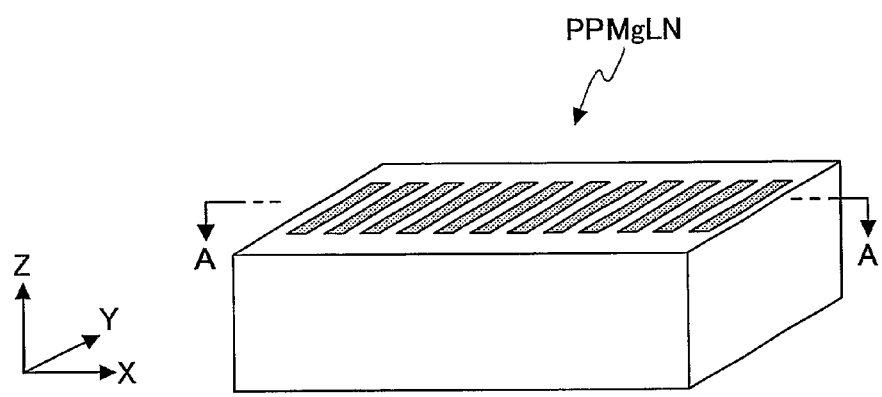
FIGS. 3A through 3C are drawings each illustrating the wavelength conversion device 50 in FIG. 1.
Figure 3B:
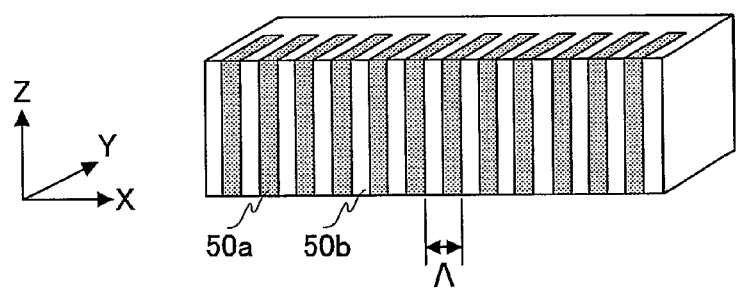

In the PPMgLN fabricated as described above, as representatively shown in FIG. 3A and FIG. 3B showing a cut-open view taken along line A-A in FIGS. 3A, X, Y, and Z directions with respect to the crystal orientation represent the longitudinal, the width, and the height directions, respectively. Also, Z direction with respect to the crystal orientation represents the polarization direction, and X direction with respect to the crystal orientation represents the periodic direction of the polarization reversed structure. It should be noted that a symbol 50a in FIG. 3B represents a domain where the direction of spontaneous polarization is reversed. Namely, the directions of spontaneous polarization in domains 50a and 50b are opposite to each other. Further, each domain 50a is not exposed on the surfaces of the PPMgLN in the width direction.

In this case, as an example, the polarization reversed period (polarization reversed pitch) "Λ " in the periodic polarization reversed structure is about 7 μm. Namely, the PPMgLN is arranged so that when a light having wavelength of 1064 nm is incident, the second harmonic (a green light having wavelength of 532 nm) is generated with high conversion efficiency.

Figure 3C:
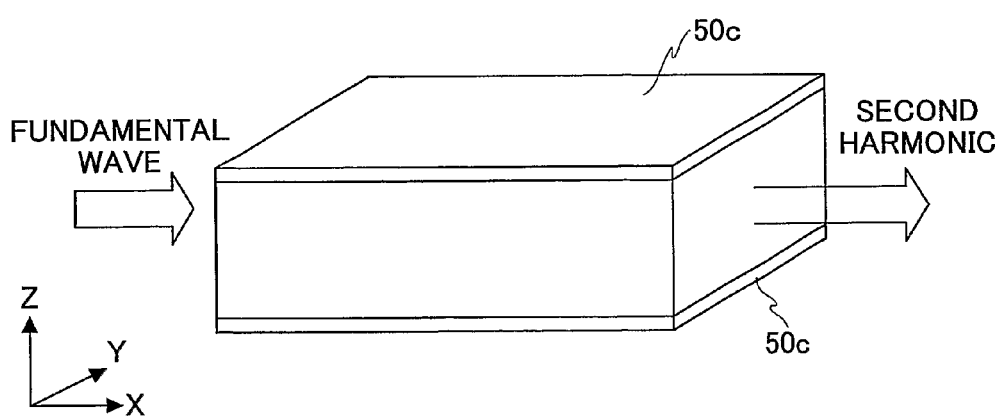

As an example shown in FIG. 3C, the PPMgLN is disposed so that an end surface on the −X side in the longitudinal direction is an incident surface of the laser fundamental wave from the solid-state laser crystal 10 and an end surface on the +X side in the longitudinal direction is an output surface. Dielectric material is coated on the incident surface so as to reduce the reflectance with respect to the laser fundamental wave (to, for example, about 0.5%).

Further, as an example shown in FIG. 3C, thin chrome (Cr) films 50c with 0.2 μm thickness are coated on the +Z and −Z surfaces of the PPMgLN by sputtering. Namely, two end surfaces where a spontaneous polarization direction is crossed are covered with a conductive member.

Referring back to FIG. 1, the mirror 60 transmits the second harmonic as it is, and separates the laser fundamental wave included in the output from the wavelength conversion device 50. The light transmitted though the mirror 60 becomes the output from the solid-state laser apparatus 100.

Next, the operations of the laser apparatus 100 configured as described above are briefly described.

The laser light for excitation from the semiconductor laser array LDa is transmitted through the convergence optical system 20a and is incident into the side surface of the solid-state laser crystal 10. Similarly, the laser light for excitation from the semiconductor laser array LDb is transmitted through the convergence optical system 20b and is incident into the side surface of the solid-state laser crystal 10.

The Nd in the core section 10a of the solid-state laser crystal 10 is excited by the laser light for excitation, thereby causing laser oscillation of the laser fundamental wave by a resonator formed between both end surfaces of the solid-state laser crystal 10. As a result, the laser fundamental wave transmitted through the B-side of the solid-state laser crystal 10 is output.

The wavelength of the laser fundamental wave is converted by the wavelength conversion device 50, and the second harmonic generated by the wavelength conversion is transmitted through the mirror 60. It should be noted that the laser fundamental wave whose wavelength is not converted may also be output from the wavelength conversion device 50, but the output laser fundamental wave is separated by the mirror 60. Namely, only the second harmonic is obtained by the mirror 60.

Figure 4:
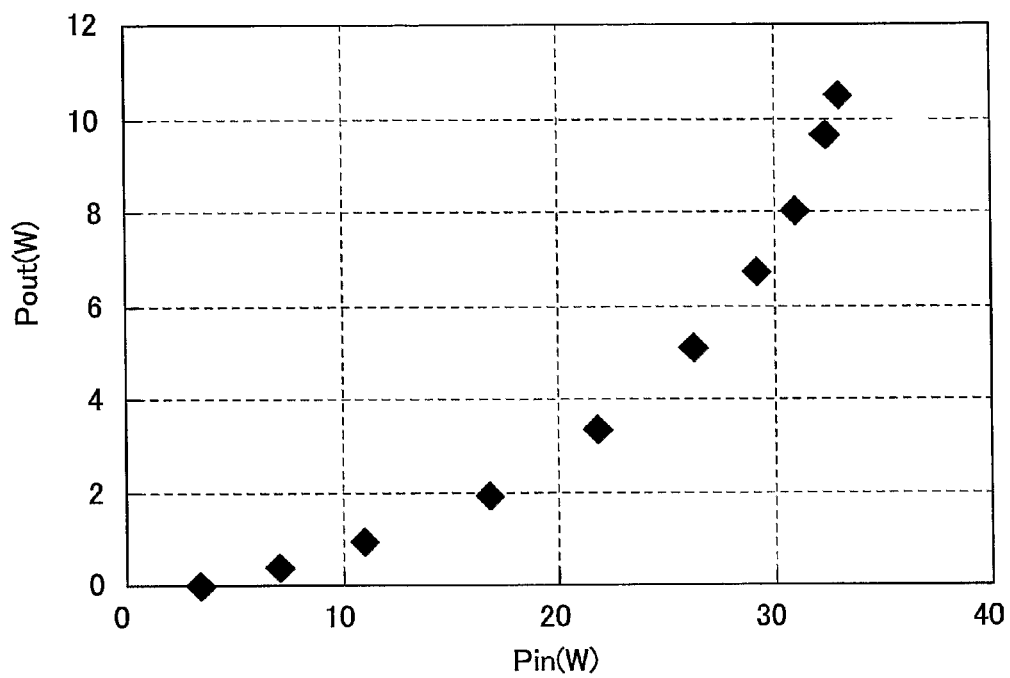
FIG. 4 is a graph showing a relationship between the power of the incident laser fundamental wave (Pin) and the power of the output second harmonic (Pout) in the wavelength conversion device 50.

In this case, as an example shown in FIG. 4, as the power of laser fundamental wave (Pin) increases, the power of the second harmonic (Pout) output from the wavelength conversion device 50 increases in proportion to nearly the square of the "Pin". Therefore, for example, when the power of the laser fundamental wave is 33 W, 10.5 W of second harmonic are stably obtained.

Figure 5:
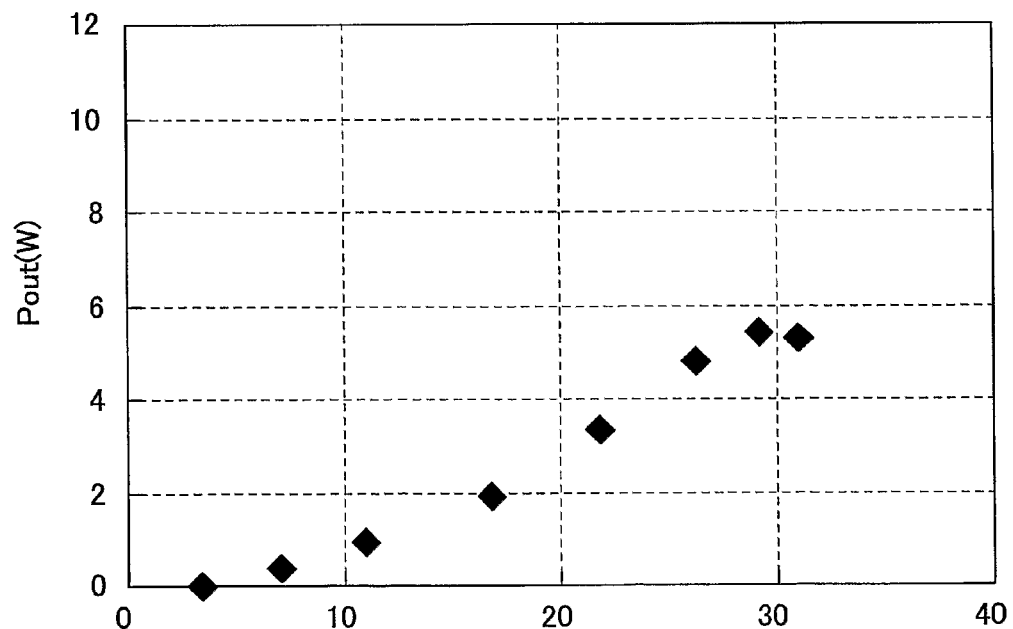
FIG. 5 is a graph showing a relationship between the power of the incident laser fundamental wave (Pin) and the power of the output second harmonic (Pout) in a conventional wavelength conversion device.

As a comparison, FIG. 5 shows the relationship between the "Pin" and the "Pout" in a case where a thin chrome (Cr) film 50c is coated only on the −Z surface of the PPMgLN. In this case, when the "Pin" exceeds 26 W, the "Pout" becomes unstable, and when the "Pin" exceeds 30 W, the PPMgLN is destroyed.

As described above, the wavelength conversion device 50 according to the embodiment of the present invention includes the PPMgLN whose +Z and −Z surfaces are covered with thin chrome (Cr) films 50c. Because of this structure, even when a high-power laser fundamental wave is incident, the PPMgLN can avoid the destruction and damage due to the electric field. Therefore, it is possible to output a high-power harmonic wave stably.

Further, the laser apparatus 100 according to the embodiment of the present invention includes two semiconductor laser arrays (LDa and LDb) each for excitation, a solid-state laser crystal 10 excited by each semiconductor laser arrays and for oscillating the laser fundamental wave, and a wavelength conversion device 50 disposed on the optical path of the laser fundamental wave output from the solid-state laser crystal 10 and capable of outputting the 10 W-level second harmonic stably. Therefore, it is possible to output a high-power laser light stably.

It should be noted that, in the above embodiment, a single lens or plural lenses may be used as the convergence optical system. Especially, when a micro lens is used, the size can be reduced.

Further, in the above embodiment, a case where the thickness of the thin chrome (Cr) film 50c is 0.2 μm is described. However, the thickness is not limited to this size.

Figure 6:
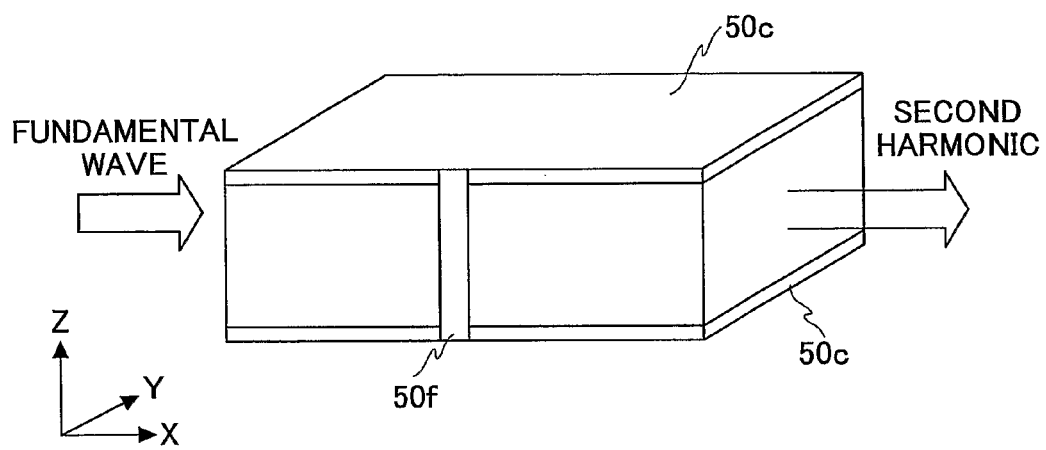
FIG. 6 is a drawing showing a first modification of the wavelength conversion device 50 in FIG. 1.

Still further, in the above embodiment, as an example shown in FIG. 6, the thin chrome (Cr) film 50c covering +Z surface of the PPMgLN and the thin chrome (Cr) film 50c covering −Z surface of the PPMgLN may be shorted with a conductive member 50f. By doing this, it is possible to reduce the voltage potential difference between the +Z and −Z surfaces of the PPMgLN to zero.

Figure 7A:
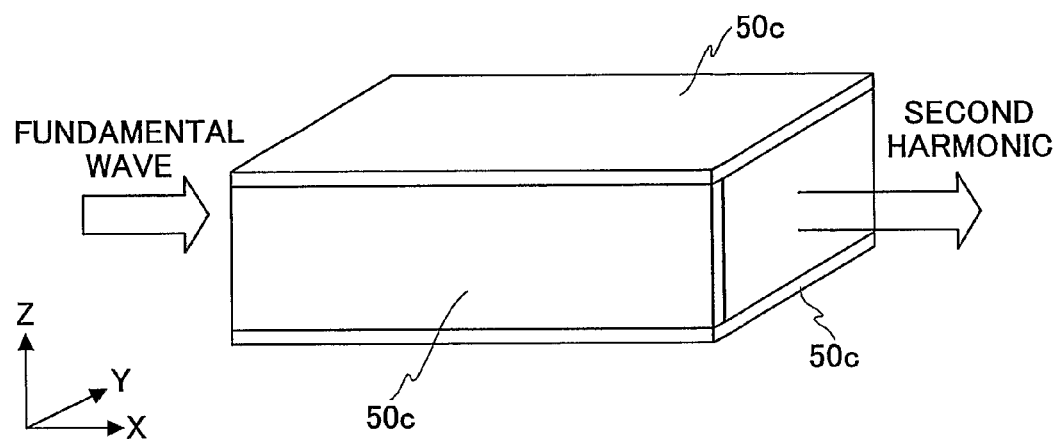
FIGS. 7A and 7B are drawings showing a second modification and a third modification, respectively, of the wavelength conversion device 50 in FIG. 1.
Figure 7B:
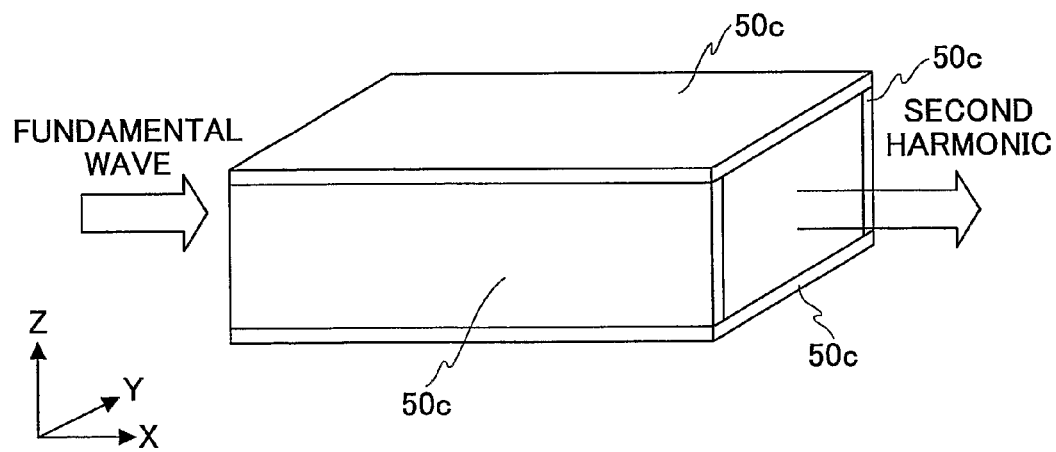

Still further, in the above embodiment, as examples shown in FIGS. 7A and 7B, at least one of the +Y and −Y surfaces with respect to the crystal orientation is additionally covered with the thin chrome (Cr) film 50c.

Still further, in the above embodiment, a case where chrome (Cr) is used as the conductive member covering the PPMgLN is described. However, the material is not limited to chrome (Cr), and, for example, aluminum (Al), silver (Ag), gold (Au), titanium (Ti) and alloys of these metals may be used.

Still further, in the above embodiment, a case is described where the conductive member covering the PPMgLN is a single layer. However, the embodiment of the present invention is not limited to this case, and a conductive member having a multilayer structure may be used. By doing this, the service life can be extended.

Figure 8:
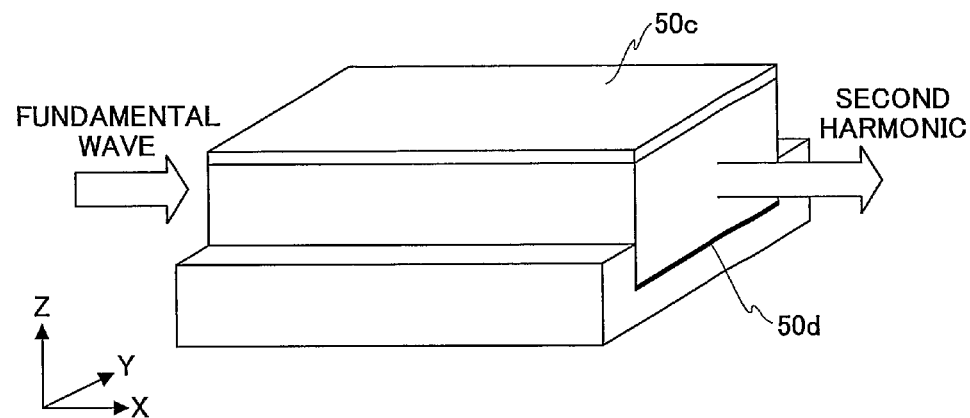
FIG. 8 is a drawing showing a fourth modification of the wavelength conversion device 50 in FIG. 1.
Figure 9:
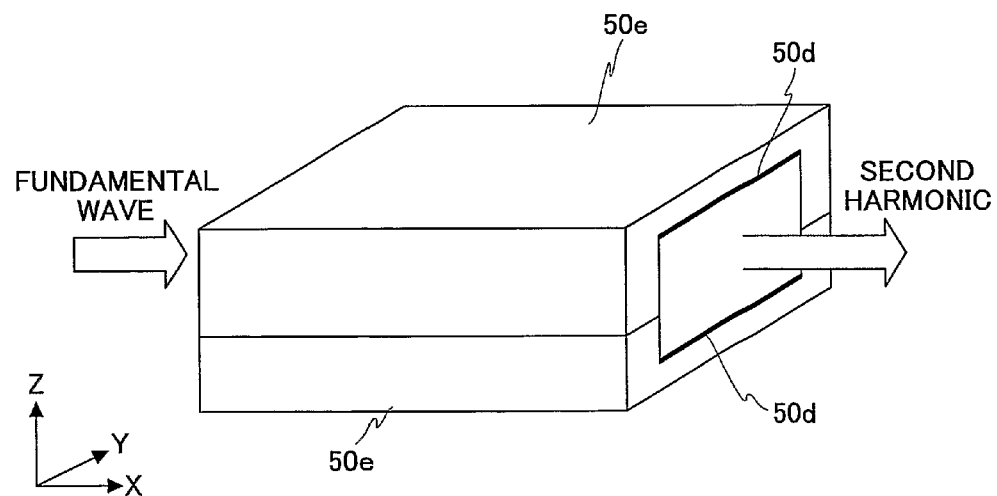
FIG. 9 is a drawing showing a fifth modification of the wavelength conversion device 50 in FIG. 1.

Still further, in the above embodiment, a case where sputtering method is used to cover the PPMgLN with the conductive member is described. However the method is not limited to sputtering, and, for example, as shown in FIGS. 8 and 9, a conductive paste 50d may be used instead of the thin chrome (Cr) film 50c. In this case, the PPMgLN may be adhered tightly to a supporting member 50e made of copper (Cu) with the conductive paste 50d.

It should be noted that silver paste in which silver particles are scattered in resin is typically used as the conductive paste 50d. However, conductive paste including metal particles of, for example, gold and copper, and particles of carbon, carbon nanotube (CNT) and indium tin oxide (ITO) may be used.

Still further, in the above embodiment, the conductive member covering the PPMgLN may be transparent like, for example, ITO, tin oxide ($SnO_2$), zinc oxide (ZnO), and indium zinc oxide (IZO). Thin films of any of these materials can be formed on the surface of the PPMgLN by, for example, the vacuum evaporation method and the sputtering method. In this case, an antireflection film made of the same material as that of the conductive member may be coated onto the incident surface of the PPMgLN instead of the dielectric material. By doing this, a coating process of the dielectric material onto the incident surface can be abbreviated so as to simplify the processes and lower the cost.

Figure 10A:
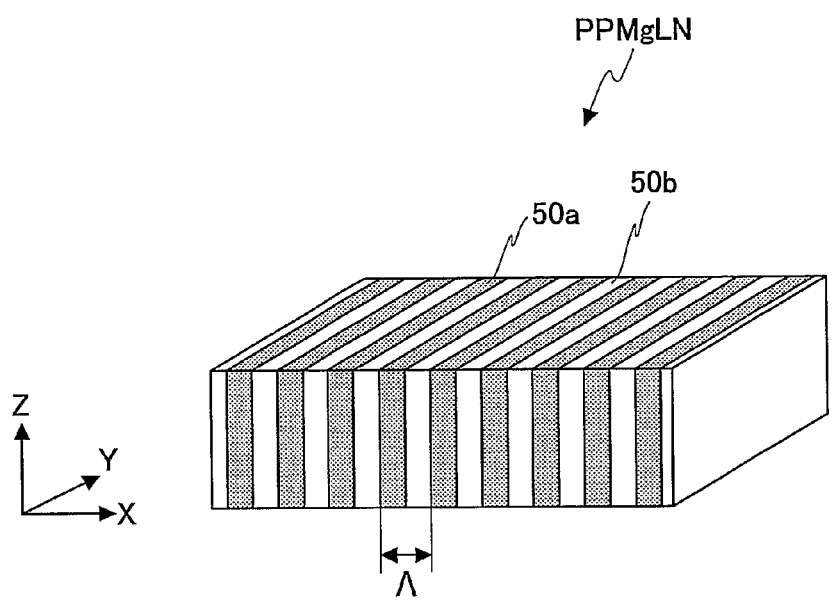
FIGS. 10A and 10B are drawings each showing a sixth modification of the wavelength conversion device 50 in FIG. 1.
Figure 10B:
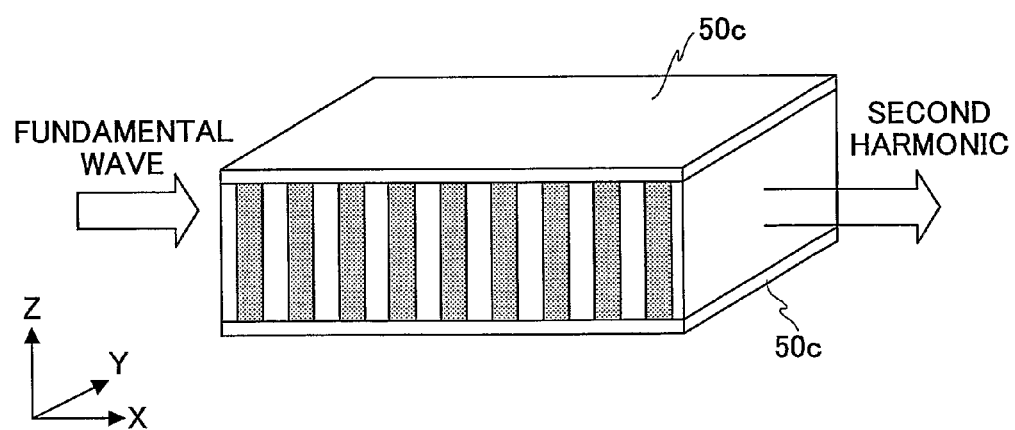

Still further, in the above embodiment, a case where the domain 50a is not exposed on the surface in the width direction of the PPMgLN is described. However, the embodiment is not limited to this structure, and as examples shown in FIGS. 10A and 10B, the domain 50a may be exposed on the surface in the width direction of the PPMgLN.

Figure 11A:
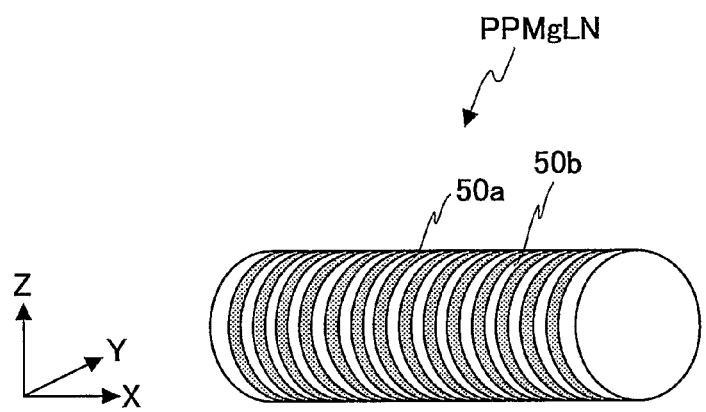
FIGS. 11A though 11D are drawings each illustrating a case where the shape of PPMgLN is cylindrical.
Figure 11B:
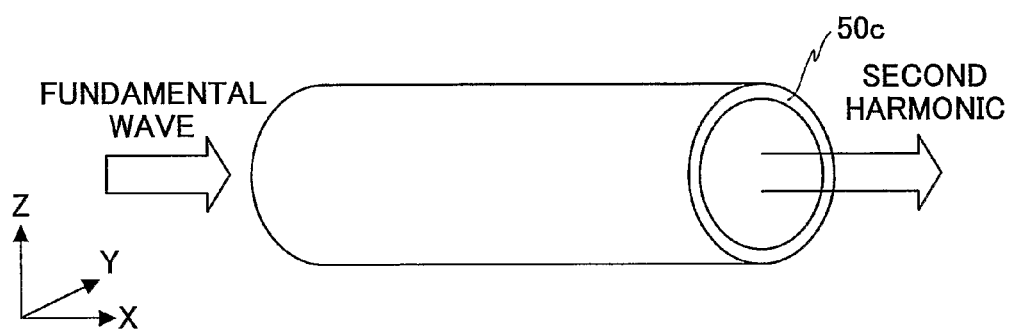
Figure 11C:
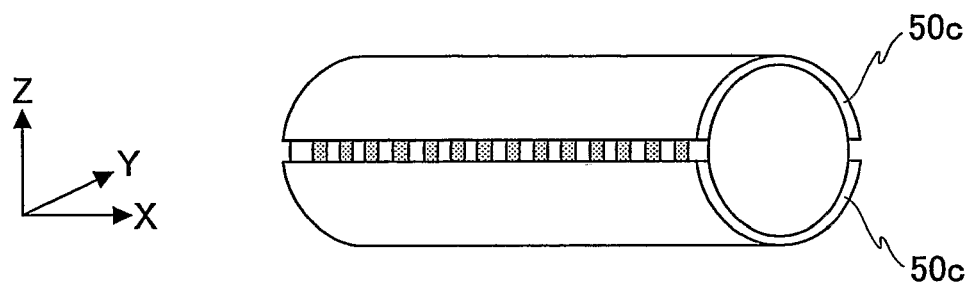
Figure 11D:
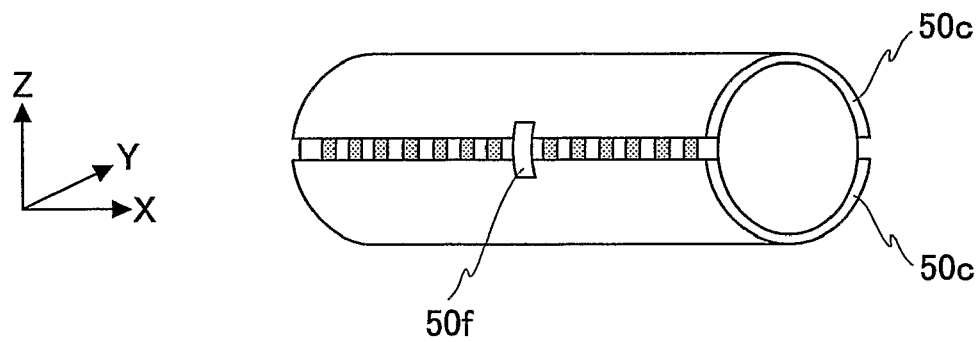

Still further, in the above embodiment, a case where the shape of the PPMgLN is a rectangular cylinder is described. However, the embodiment is not limited to this, and, for example, a circular or an elliptical shape with respect to a cross section orthogonal to the periodic direction of the polarization reversed structure may also be applicable. In this case, the circumference surface of the PPMgLN may be covered with the conductive member 50c (see FIG. 11B), or at least two domains where a spontaneous polarization direction is crossed may be covered with the conductive members 50c (see FIG. 11C). Further, the conductive members 50c covering at least two domains may be shorted with the conductive member 50f (see FIG. 11D).

Still further, in the above embodiment, a case where Nd:YVO$_4$ crystal is used as the solid-state laser crystal is described. However, the embodiment of the present invention is not limited to this, and, for example, Nd:GdVO$_4$, a Nd:YAG crystal, a Yb:YAG crystal, a Nd: Strontium-Lanthanum-Aluminate (ASL) crystal, and a Nd:Lanthanum-Scandium-Borate (LSB) crystal may be used as the solid-state laser crystal.

Still further, in the above embodiment, a semiconductor laser excitation solid-state laser apparatus capable of efficiently exciting a laser crystal by applying exciting rays to its side surfaces is described as the laser apparatus. However, the embodiment of the present invention is not limited to this, and a semiconductor laser excitation solid-state laser apparatus capable of efficiently exciting a laser crystal by applying exciting rays to its end faces may be used. Namely, the incident surface of the laser light for excitation in the solid-state laser crystal may be the A-side or the B-side of the solid-state laser crystal 10.

Still further, in the above embodiment, sizes of the solid-state laser crystal 10 and the PPMgLN are not limited to the sizes described above.

Still further, in the above embodiment, a case where the wavelength of the light incident into the PPMgLN is 1064 nm is described. However, the embodiment of the present invention is not limited to this, and, for example, a light having wavelength of 914 nm or 1340 nm may be incident into the PPMgLN. When the wavelength of the incident light is 914 nm, a high-power blue light having wavelength of 457 nm is output from the PPMgLN, and when the wavelength of the incident light is 1340 nm, a high-power red light having wavelength of 670 nm is output from the PPMgLN.

<<Image Forming Apparatus>>

Figure 12:
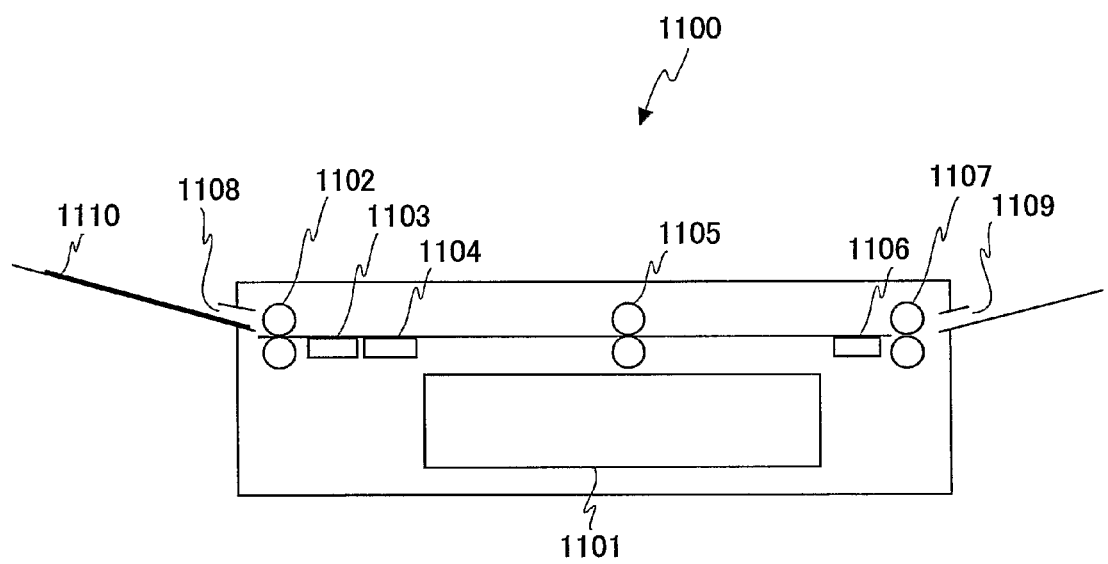
FIG. 12 is a drawing schematically showing a multicolor image forming apparatus corresponding to a rewritable recording sheet according to one embodiment of the present invention.

FIG. 12 schematically shows a configuration of a multicolor image forming apparatus 1100 as an image forming apparatus according to an embodiment of the present invention. The multicolor image forming apparatus 1100 is capable of corresponding to a rewritable recording sheet and includes an exposure apparatus 1101, plural feed rollers (1102, 1105, and 1107), an ultraviolet curing unit 1103, a heating device 1104, and a heating device 1106.

The exposure apparatus 1101 includes a laser apparatus corresponding to a red color, a laser apparatus corresponding to a green color, and a laser apparatus corresponding to a blue color. Each laser apparatus includes a wavelength conversion device having a nonlinear optical crystal whose at least +Z and −z surfaces are covered with conductive members similar to the wavelength conversion device 50.

It should be noted that the exposure apparatus 1101 may be used in scanning lights from each laser apparatus onto a rewritable recording sheet or in scanning lights of each laser apparatus onto a rewritable recording paper via, for example, a liquid crystal panel.

General matters on the multicolor image forming apparatus 1100 are disclosed in, for example, Japanese Patent Application Publication No. 2003-312064.

Because of the configuration, in the multicolor image forming apparatus 1100, each laser apparatus can output a 10 W-level laser light stably. Therefore, it is possible to form an image quickly.

<<Display Apparatus>>

Figure 13:
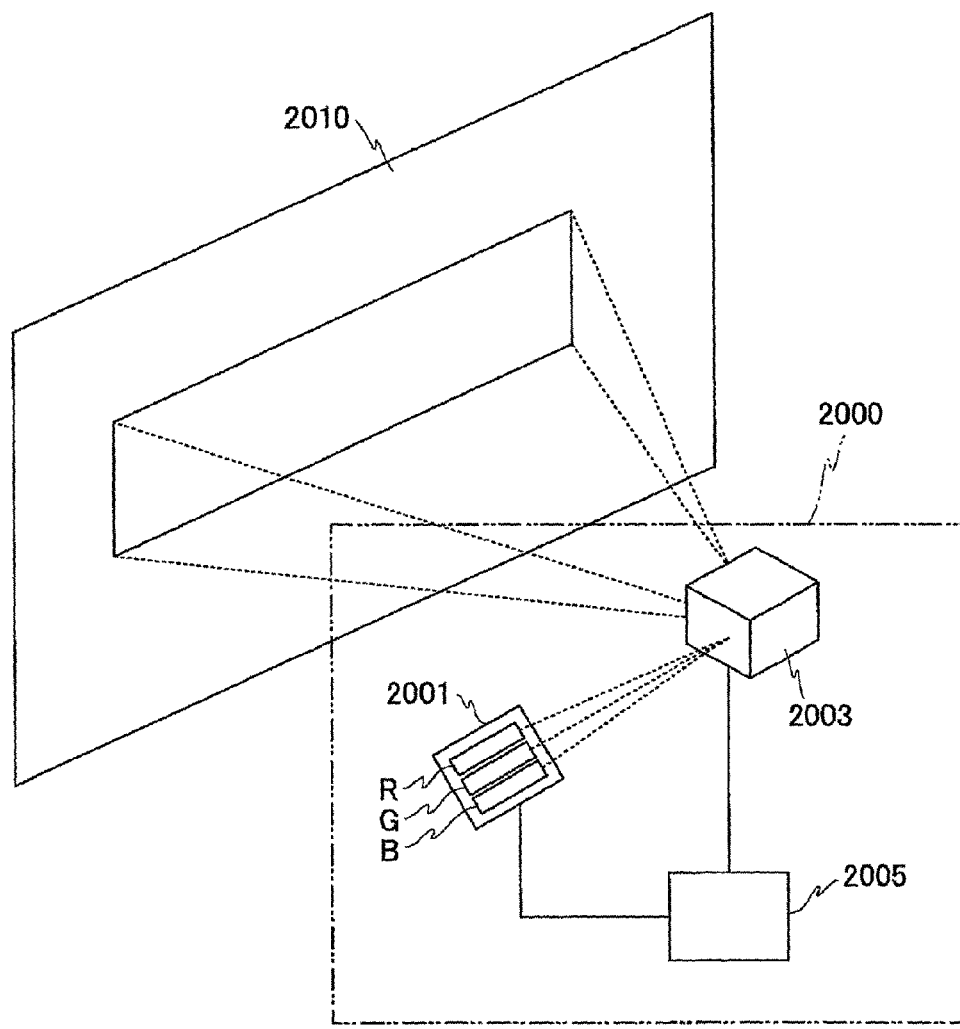
FIG. 13 is a drawing showing a laser display apparatus according to one embodiment of the present invention.

FIG. 13 schematically shows a configuration of a laser display apparatus 2000 as a display apparatus according to an embodiment of the present invention.

The laser display apparatus 2000 includes a light source unit 2001, an optical system 2003 having a mirror for reflecting the laser lights from the light source unit 2001 toward the screen 2010, and a control unit 2005 for controlling the light source unit 2001 and the optical system 2003.

The light source unit 2001 includes a laser apparatus "R" outputting a red light, a laser apparatus "G" outputting a green light, and a laser apparatus "B" outputting a blue light. Each laser apparatus includes a wavelength conversion device having a nonlinear optical crystal whose at least +Z and −z surfaces are covered with conductive members similar to the wavelength conversion device 50.

Because of the configuration, in the laser display apparatus 2000 according to the embodiment of the present invention, each laser apparatus of the light source unit 2001 can output a 10 W-level laser light stably. Therefore, it is possible to display a picture and characters on the screen 2010 with excellent display quality.

It should be noted that even if a laser display apparatus that displays images by irradiating laser lights toward the space, when the laser display apparatus includes the light source unit 2001, it is possible to perform a desired display quickly.

Figure 14:
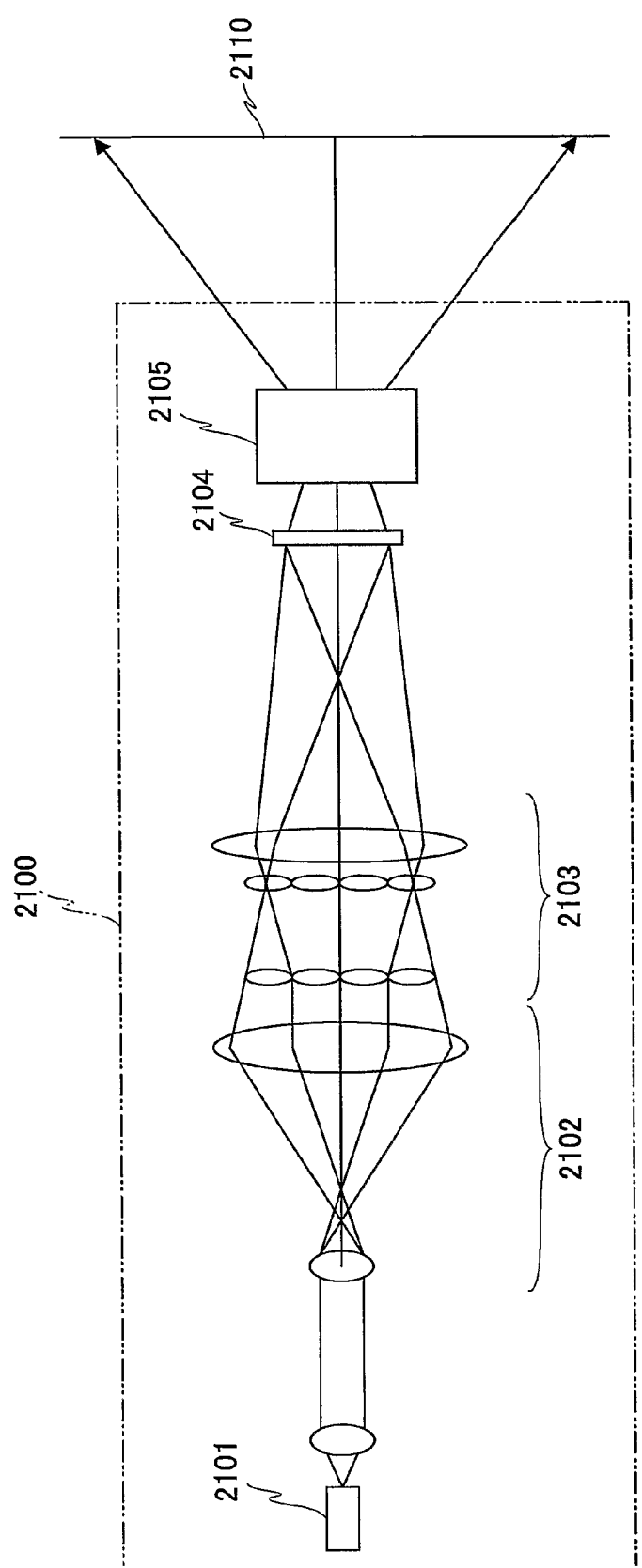
FIG. 14 is a drawing showing a projector according to one embodiment of the present invention.

Further, FIG. 14 schematically shows a configuration of a projector 2100 using a transmissive liquid crystal panel.

This projector 2100 includes a light source device 2101, a collimated optical system 2102, an integrated optical system 2103, a liquid crystal panel 2104, and a projector lens 2105.

The light source device 2101 includes a laser light source, and a wavelength conversion device having a nonlinear optical crystal whose at least +Z and −Z surfaces are covered with conductive members similar to the wavelength conversion device 50, and outputs a green light whose wavelength is converted.

The light output from the liquid crystal panel 2104 is incident into the liquid crystal panel 2104 via the collimated optical system 2102 and the integrated optical system 2103.

The light incident into the liquid crystal panel 2104 is modulated based on display information and is enlarged and projected on the screen 2110 by the projector lens 2105.

In this case as well, a high-power light is output from the light source device 2101. Therefore, it is possible to display information on the screen 2110 with excellent display quality.

It should be noted that a projector using a reflective liquid crystal panel may also be used.

The present invention is not limited to the above-mentioned embodiments, and variations and modifications may be made without departing from the scope of the present invention.

The present application is based on and claims the benefit of priority of Japanese Patent Application No. 2007-078233 filed on Mar. 26, 2007, the entire contents of which are hereby incorporated by reference.

INDUSTRIAL APPLICABILITY

As described above, the wavelength conversion device according to an embodiment of the present invention is suitable to output a high-power harmonic stably. Further, the laser apparatus according to an embodiment of the present invention is suitable to output a high-power laser light stably. Still further, the image forming apparatus according an embodiment of the present invention is suitable to form an image quickly. Still further, the display apparatus according to an embodiment of the present invention is suitable to display information with excellent display quality.

The invention claimed is:

1. A wavelength conversion device comprising:
   a nonlinear optical crystal having a periodic polarization reversed structure; and
   transparent conductive members covering at least two regions of the nonlinear optical crystal, wherein
   a spontaneous polarization direction of the nonlinear optical crystal crosses the at least two regions, and
   an incident surface of the nonlinear optical crystal is covered with an antireflection film made of a same material as that of the transparent conductive members.

2. The wavelength conversion device according to claim 1, wherein
   the conductive members covering the at least two regions are shorted to each other.

3. The wavelength conversion device according to claim 1, wherein
   the at least two regions includes a +z surface and a −z surface of the crystal surfaces.

4. The wavelength conversion device according to claim 3, wherein the at least two regions further include either a +Y surface or a −Y surface of the crystal surfaces.

5. A laser apparatus comprising:
   at least one laser light source; and
   the wavelength conversion device according to claim 1 disposed on an optical path of a laser light from the at least one laser light source.

6. An image forming apparatus for forming an image on an image display medium, the image forming apparatus comprising:
   at least one laser apparatus according to claim 5; and
   an exposure apparatus for exposing the image display medium based on image information.

7. A display apparatus for displaying information on a screen using a light, the display apparatus comprising:
   a light source unit having at least one laser apparatus according to claim 5; and
   an optical system for transmitting the light from the light source unit to the screen.

8. The wavelength conversion device according to claim 1, wherein the transparent conductive members have a multilayered structure.

9. The wavelength conversion device according to claim 1, wherein the transparent conductive members include one of ITO, tin oxide, zinc oxide, or indium oxide.

10. A wavelength conversion device comprising:
    a nonlinear optical crystal having a periodic polarization reversed structure, a cross sectional shape orthogonal to the periodic direction of the polarization reversed structure being substantially a circle or an ellipse; and
    a transparent conductive member covering a circumferential surface of the nonlinear optical crystal,
    wherein an incident surface of the nonlinear optical crystal is covered with an antireflection film made of a same material as that of the transparent conductive member.

11. The wavelength conversion device according to claim 1, wherein
    the nonlinear optical crystal is an Mg-doped lithium niobate crystal.

12. The wavelength conversion device according to claim 1, wherein
    at least a part of the conductive member is a metal.

13. The wavelength conversion device according to claim 1, wherein
    at least a part of the conductive member is a conductive paste.

* * * * *